(12) United States Patent  (10) Patent No.: US 8,429,653 B2
Barros et al.  (45) Date of Patent: Apr. 23, 2013

(54) PROCESS MODEL CONTROL FLOW WITH MULTIPLE SYNCHRONIZATIONS

(75) Inventors: Alistair P. Barros, Camira (AU); Alexander Grosskopf, Berlin (DE)

(73) Assignee: SAP AG, Walldorf (DE)

( * ) Notice: Subject to any disclaimer, the term of this patent is extended or adjusted under 35 U.S.C. 154(b) by 1450 days.

(21) Appl. No.: 11/807,999

(22) Filed: May 31, 2007

(65) Prior Publication Data

US 2008/0301419 A1   Dec. 4, 2008

(51) Int. Cl.
 *G06F 9/46* (2006.01)
 *G06Q 10/00* (2012.01)
(52) U.S. Cl.
 USPC ............................................ 718/100; 705/7.27
(58) Field of Classification Search ................. None
 See application file for complete search history.

(56) References Cited

U.S. PATENT DOCUMENTS

| | | | | |
|---|---|---|---|---|
| 5,870,545 A | * | 2/1999 | Davis et al. | 709/201 |
| 6,397,192 B1 | * | 5/2002 | Notani et al. | 705/7.26 |
| 7,024,670 B1 | * | 4/2006 | Leymann et al. | 718/102 |
| 2003/0195785 A1 | * | 10/2003 | Thalangara et al. | 705/8 |

OTHER PUBLICATIONS

Forte Fusion Process Development Guide—Release 2.1 of Forte Fusion Sun Microsystems Chapters 1, 7, and 9 Nov. 2000.*
Workflow Control-Flow Patterns—A Revised View Nick Russell, Arthur H.M. ter Hofstede, Wil M.P. van der Aalst, Nataliya Mulyar BPM Center Report BPM-06-22 pp. 1-77 Sep. 2006.*
A model to support collaborative work in virtual enterprises Olivier Perrin, Claude Godart Jan. 2004.*
Modeling of Mixed Control and Dataflow Systems in MASCOT Per Bjuréus and Axel Jantsch IEEE Transactions on Very Large Scale Integration (VLSI) Systems, vol. 9, No. 5 Oct. 2001.*
Process Modeling Notations and Workflow Patterns Stephen A. White BPTrends from IBM Corporation Mar. 2004.*
Pattern Based Analysis of EAI Languages—The Case of the Business Modeling Language Petia Wohed, Erik Perjons, Marlon Dumas, and Arthur ter Hofstede 5th International Conference on Enterprise Information Systems (ICEIS) Apr. 2003.*
From Business Process Models to Process-oriented Software Systems: The BPMN to BPEL Way Chun Ouyang, Marlon Dumas, Wil M.P. van der Aalst, and Arthur H.M. ter Hofstede BPM Center Report BPM-06-27 2006.*
Achieving a General, Formal and Decidable Approach to the OR-Join in Workflow Using Reset Nets Moe Thandar Wynn, David Edmond, W.M.P. van der Aalst, and A.H.M. ter Hofstede ICATPN 2005, LNCS 3536, pp. 423-443 2005.*
xBPMN—formal control flow specification of a BPMN based process execution language Alexander Grosskopf Master's thesis, selected pages Jul. 2007.*

(Continued)

*Primary Examiner* — Emerson Puente
*Assistant Examiner* — Paul Mills
(74) *Attorney, Agent, or Firm* — Brake Hughes Bellermann LLP (57) ABSTRACT

Activations of a plurality of incoming branches may be detected at a synchronization point having a plurality of outgoing branches. A first synchronization may be executed after a first number of activations is detected, and at least one of a plurality of outgoing branches from the synchronization point may be activated, based on the first synchronization. A second synchronization may be executed after a second number of activations is detected, and at least a second one of the plurality of outgoing branches from the synchronization point may be activated, based on the second synchronization.

16 Claims, 7 Drawing Sheets

OTHER PUBLICATIONS

Ouyang et al.,"Pattern-based Translation of BPMN Process Models to BPEL Web Services", International Journal of Web Services Research (JWSR), vol. 5, No. 1, Mar. 30, 2007, pp. 42-62.

Wohed et al.,"Pattern-based Analysis of BPMN—An extensive evaluation of the Control-flow, the Data and the Resource Perspectives", BPM Center Report BPM-05-26, 2005, 23 pages.

Wohed et al.,"Pattern Based Analysis of BPEL4WS", Technical Report, Department of Computer and Systems Sciences, Stockholm University, the Royal Institute of Technology, Sweden, 2003, 20 pages.

Wohed et al.,"On the Suitability of BPMN for Business Process Modelling", Proceedings 4th International Conference on Business Process Management (BPM 2006), LNCS, 2006, pp. 161-176.

Recker et al.,"Representation theory versus workflow patterns—The case of BPMN", 25th International Conference on Conceptual Modeling, Lecture notes in Computer Science, vol. 4215, Nov. 6-9, 2006, pp. 68-83.

White, "Using BPMN to Model a BPEL Process", BPTrends, vol. 3, No. 3, Mar. 2005, 18 pages.

White, "Process Modeling Notations and Workflow Patterns", BPTrends, Workflow Handbook, Mar. 2004, 24 pages.

IBM,"IBM Correlation Sets in BPEL Processes", Retrieved on Nov. 21, 2007 from http://www-1.ibm.com/support/docview.wss?rs=1079&tc=SSCXMC, 5 pages.

Aalst et al.,"Advanced Workflow Patterns", Proceedings of the 7th International Conference on Cooperative Information Systems, 2000, 12 pages.

Russell et al.,"Workflow Resource Patterns: Identification, Representation and Tool Support", Proceedings of the 17th Conference on Advanced Information Systems Engineering (CAiSE'05), vol. 3520, 2005, pp. 216-232.

Russell et al.,"Workflow Exception Patterns", 18th Conference on Advanced Information Systems Engineering Lecture Notes in Computer Science, vol. 4001, Jun. 5-9, 2006, pp. 288-302.

Russell et al.,"Workflow Control-Flow Patterns : A Revised View", BPM Center Report BPM-06-22 , BPMcenter.org, 2006, 134 pages.

Aalst et al.,"Workflow Patterns", Distributed and Parallel Databases, vol. 14, No. 3, Jul. 2003, 70 pages.

Russell et al.,"Workflow Data Patterns", QUT Technical report, FIT-TR-2004-01, Queensland University of Technology, Brisbane, 2004, 75 pages.

Oasis Standard,"Web Services Business Process Excecution Language Version 2.0", wsbpel-v2.0-OS, Apr. 11, 2007, 264 pages.

Russell et al.,"Workflow Resource Patterns", BETA Working Paper Series, WP 127, Eindhoven University of Technology, Eindhoven, 2004, 73 pages.

Juric, M. B.,"A Hands-on Introduction to BPEL", Retrieved on Jul. 29, 2008 from www.oracle.com/technology/pub/articles/matjaz_bpell.html, Jan. 1, 2005, 12 pages.

Recker et al.,"Do Process Modelling Techniques Get Better? A Comparative Ontological Analysis of BPMN", 16th Australasian Conference on Information Systems, Nov. 29-Dec. 2, 2005, 10 pages.

Fisteus et al.,"Applying Model Checking to BPEL4WS Business Collaborations", Proceedings of the 2005 ACM Symposium on Applied Computing, 5 pages.

Fu et al.,"Analysis of Interacting BPEL Web Services", Proceedings of the 13th International Conference on World Wide Web, May 17-22, 2004, pp. 621-630.

Ouyang et al.,"Translating Standard Process Models to BPEL", BPM Center Report BPM-05-27, BPMcenter.org, 2005, 17 pages.

Ouyang et al.,"From BPMN Process Models to BPEL Web Services", Proceedings of the IEEE International Conference on Web Services, 2006, 8 pages.

Ouyang et al.,"Formal Semantics and Analysis of Control Flow in WS-BPEL", BPM Center Report BPM-05-13, BPMcenter. org, 2005, 34 pages.

Ouyang et al.,"From Business Process Models to Process-oriented Software Systems: The BPMN to BPEL Way", QUT eprint, ID-5969, 2006, 37 pages.

Ouyang et al.,"Translating BPMN to BPEL", BPM Center Report BPM-06-02, BPMcenter. org, 2006, 22 pages.

Recker et al.,"On the Translation between BPMN and BPEL: Conceptual Mismatch between Process Modeling Languages", Proceedings of 18th International Conference on Advanced Information System Engineering, Proceedings of Workshop and Doctoral Consortiums, 2006, 12 pages.

OASIS,"OASIS Web Services Business Process Execution Language (WSBPEL) TC", Copyright 1993-2007, retrieved on Nov. 26, 2007 from http://www.oasis-open.org/committees/tc_home.php?wg_abbrev=wsbpel, 3 pages.

BPMI, "Business Process Modeling Notation (BPMN) Version 1.0", Business Process Management Initiative, BPMI. org, May 3, 2004, 296 pages.

Extended Search Report for European Patent Application No. 08004786.3, mailed Jun. 27, 2008, 6 pages.

ActiveBPEL, LLC., "ActiveBPEL Engine Architecture", Copyright 2004-2006, Retrieved on Dec. 6, 2006, from http://www.activebpel.org/docs/architecture.html, 9 pages.

Aalst et al.,"Let's Go All the Way: From Requirements via Colored Workflow Nets to a BPEL Implementation of a New Bank System", In Proceedings Agia Napa, Cyprus, CoopIS '05, 2005, 18 pages.

* cited by examiner

PROCESS MODEL CONTROL FLOW WITH MULTIPLE SYNCHRONIZATIONS

TECHNICAL FIELD

This description relates to workflow process models.

BACKGROUND

Modeling languages may be used as meta-languages to describe and execute underlying processes, such as business processes. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result. Further, such process modeling generally relies on language that is common to, and/or interoperable with, many types of software applications and/or development platforms. As a result, process modeling may be used to provide integration of business applications both within and across enterprise organizations.

Thus, such modeling languages allow a flow of activities or tasks to be graphically captured and executed, thereby enabling resources responsible for the activities to be coordinated efficiently and effectively. The flow of work in a process is captured through routing (e.g., control flow) constructs, which allow the tasks in the process to be arranged into the required execution order through sequencing, choices (e.g., decision points allowing alternative branches), parallelism (e.g., tasks running in different branches which execute concurrently), iteration (e.g., looping in branches) and synchronization (e.g., the coming together of different branches).

In the context of such processes, as just referenced, it may occur that a number of tasks or activities may be executed in parallel. Further, in real-world scenarios, it may occur that a selection or execution of subsequent tasks may depend on a current or final outcome(s) of some or all of the executing, parallel tasks. For example, a business process model may include multiple tasks, executing in parallel, that are each related to loan requests for obtaining loan approval from one or more of a number of lenders. Subsequent tasks may thus hinge on a current or final outcome of some or all of these loan requests. For example, as loan requests are transmitted, it may occur that some loan requests may never be answered, or may result in loan approvals for loans have extremely high or extremely low interest rate(s), or may have some other desirable or undesirable result. Consequently, for example, subsequent tasks may include aborting the loan process for lack of desirable loan options after some period of time, or may include selecting some defined subset of the resulting loan approvals, or may include initiating new loan requests.

Frequently, it may be difficult or problematic to express and encompass such parallel tasks, and pluralities of subsequent tasks (and criteria for decisions therebetween), in a manner that is executable as a process model. For example, even when such parallel tasks are combined or synchronized at a defined point in the process model, the result may be simply that a pre-specified, static number of the parallel tasks (for example, 2 out of a possible 4 tasks) cause execution of a subsequent task. Such approaches, however, may be limited in applicability and usefulness. For example, a different or dynamic number of parallel tasks may be implemented, or a different or dynamic number of the implemented tasks may optimally be required before synchronization occurs. For example, in the example just given, it may be that 4 tasks anticipated at design-time may become 5 or more tasks at run-time, and/or it may occur that instead of 2 tasks being required for activation, a user of the process model may wish to cause synchronization after a single one of the parallel tasks executes, or after 3 or more execute, or after some changing or dynamic number(s) execute. Thus, in these and other cases, process models may fail or be limited in their goal of expressing real-world processes in a flexible, repeatable, computer-executable manner.

SUMMARY

According to one general aspect, a system may include a branch manager configured to detect activation of any of a plurality of incoming branches of a workflow process at a synchronization point, and configured to identify an activated branch from among the plurality of incoming branches. The system may further include a flow condition evaluator configured to evaluate at least one synchronization condition as being fulfilled, based on the activation and on the identified, activated branch, and a branch condition evaluator configured to determine the fulfillment of the at least one synchronization condition and to evaluate, based thereon, a branch condition to select at least one outgoing branch from among at least two outgoing branches from the synchronization point.

According to another general aspect, activations of a plurality of incoming branches may be detected at a synchronization point having a plurality of outgoing branches. A first synchronization may be executed after a first number of activations is detected, and at least one of a plurality of outgoing branches from the synchronization point may be activated, based on the first synchronization. A second synchronization may be executed after a second number of activations is detected, and at least a second one of the plurality of outgoing branches from the synchronization point may be activated, based on the second synchronization.

According to another general aspect, a computer program product may be used for executing instances of process models, the computer program product being tangibly embodied on a computer-readable medium and including executable code that, when executed, is configured to cause at least one data processing apparatus to execute an orchestration engine. The orchestration engine may be configured to detect a first activation of one of a plurality of parallel branches at a synchronization point, and spawn a continuous synchronizer. The continuous synchronizer may be configured to synchronize a first executed subset of the parallel branches, cause a subsequent execution of a first subsequent branch, based on the first executed subset, synchronize a second executed subset of the parallel branches, and cause a subsequent execution of a second subsequent task, based on the second executed subset.

The details of one or more implementations are set forth in the accompanying drawings and the description below. Other features will be apparent from the description and drawings, and from the claims.

DETAILED DESCRIPTION

Figure 1:
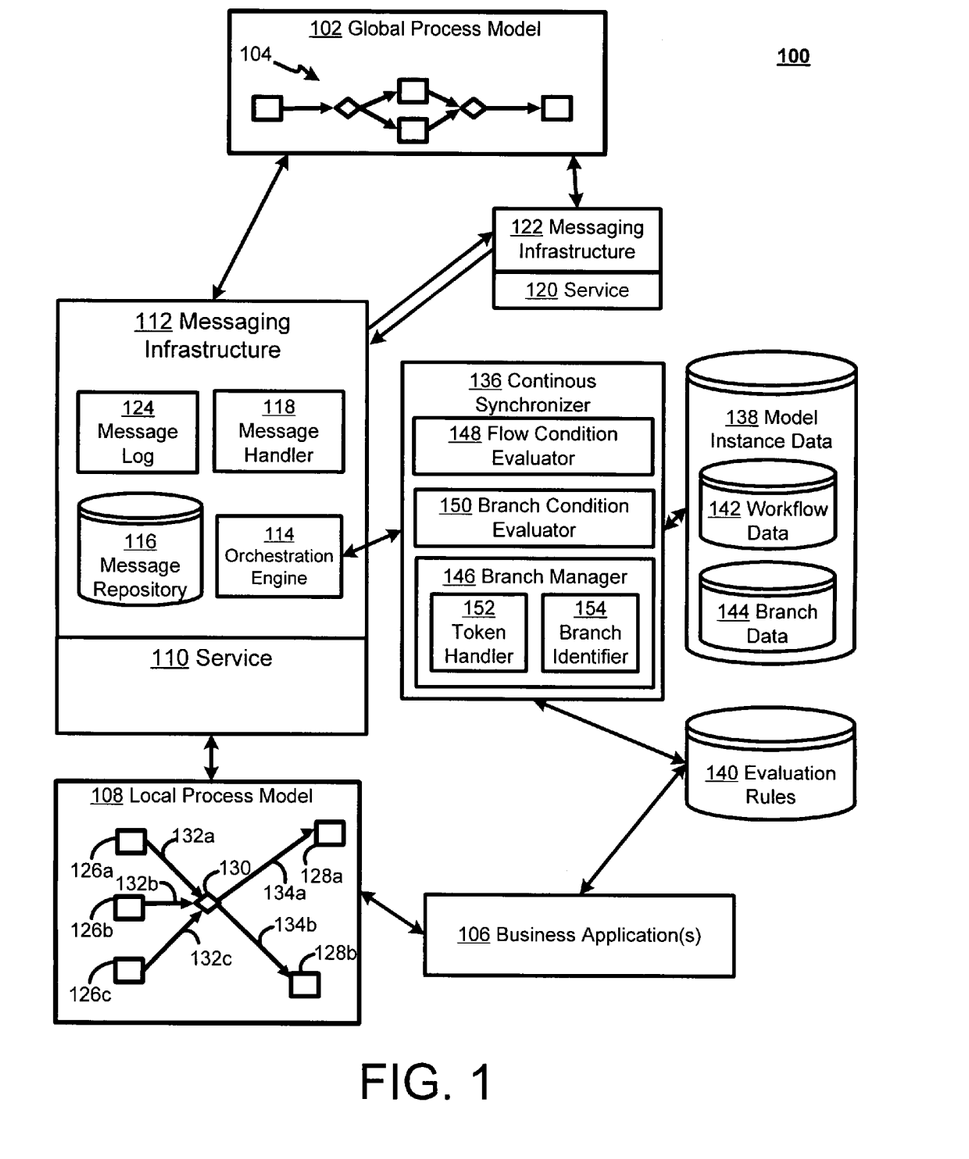
FIG. 1 is a block diagram of a system for performing multiple synchronizations in process models.

FIG. 1 is a block diagram of a system 100 for performing multiple synchronizations in process models. For example, the system 100 allows for processing of parallel tasks in a manner that considers and evaluates different execution scenarios for the parallel tasks, and that considers and selects from among different, subsequent tasks that may result from the various execution scenarios. For example, the system 100 may synchronize a first executed subset of the parallel tasks (resulting in subsequent execution of a first subsequent task), and may later synchronize a second executed subset of the parallel tasks (resulting in subsequent execution of a second subsequent task). In this way, for example, the system 100 provides for flexible yet tightly-controlled execution of parallel tasks, and provides for flexible and comprehensive options for subsequent tasks after the parallel tasks, with well-defined relationships between the parallel tasks and the subsequent tasks. Consequently, the system 100 provides workflow designers and users with the ability to implement workflow process models in a manner that more accurately and completely reflects real-world usage scenarios of parallel processes.

In the example of FIG. 1, a global process model 102 represents a business process model that is implemented, and agreed on, by a number of collaborating service providers, such that the service providers perform tasks 104 of the global process model 102. The service providers may make pre-arrangements regarding their interactions with one another (e.g., arrangements governing messages, message formats, or message types, as well as arrangements governing an order of the messages to be sent and/or tasks to be performed). By way of specific example, a purchase order may be sent by one service provider that may require either acknowledgement or rejection by one or more other service provider(s). The global process model 102 (also referred to as a global choreography model) thus provides a way of capturing, contractualizing, and implementing potentially complex and long-running message exchange sequences between service providers, in order to execute a desired business process.

For example, a business application 106 may be built and implemented by an enterprise or other entity to perform some business functionality, such as, for example, creating a purchase order and sending the purchase order or loan request to a number of (possibly competing) suppliers. The business application 106 may implement a local process model 108 that, analogously to the global process model 102, formalizes and defines the roles of the business application 106 within the global process model 102, e.g., with respect to the purchase order or loan request example(s) just mentioned. For example, the local process model 108 may describe what types of messages may or should be exchanged with the suppliers as part of the purchase order.

In the example of FIG. 1, tasks of the global process model 102 and the local process model 108 are executed at least in part using application services. For example, the business application 106 and the local process model 108 may be associated with at least one service 110. In this context, the service 110 refers to an application having one or more specific functionalities that are exposed to other applications, often over a network (e.g., the Internet) by way of a service interface (where an operation and use of the interface may be known or determined, as needed). When such a service (and/or an interface of the service) is exposed/available over the World Wide Web (referred to herein as the WWW or the web), then the service may be known as a web service.

Using such services and service interactions to implement process models may be referred to as a service-oriented architecture (SOA), in which, as just described, process tasks result in execution of the services. Further, processes that rely on services to realize process steps may themselves be deployed and accessed as services, which may be referred to as process-based service composition. Languages exist, such as, for example, the Business Process Execution Language (BPEL), that are designed to provide such compositions of services (e.g., web services), and thus provide a top-down, process-oriented approach to the SOA. Accordingly, BPEL or other such languages (such as, for example, the Web Services Flow Language (WSFL), the eXtensible language (XLANG), and/or the Business Process Modeling Language (BPML)), or modifications/extensions thereof, may be used to define the global process model 102 and/or the local process model 108.

In FIG. 1, in order to integrate the service 110 within the global process model 102, a messaging infrastructure 112 is included. Generally, the messaging infrastructure 112 facilitates instantiation and execution of the local process model 108. The messaging infrastructure 112 includes an orchestration engine 114 that is operable, among other functions, to execute an instance of the local process model 108. For example, the orchestration engine 114 may be in charge of ensuring that a given task of the local process model 108 has actually been executed and completed, before allowing the instance to proceed to a following task. Other functions and examples of the orchestration engine 114 are known, and/or are described in more detail, below.

A message repository 116 represents a database or other memory that may be used, for example, to store message types or templates, as well as actual messages (including both outgoing and/or incoming messages). For example, as described in more detail below, the message repository 116 may include a number of message types that are specific to, or associated with, (functionality of) the business application 106. For instance, in the case where the business application 106 is used to generate purchase orders, there may be a number of associated message types in the message repository 116, which may be pre-configured to some extent based on, for example, a type of purchase order or an identity of the recipient(s) of the purchase order.

A message handler 118 may be used to send and receive actual messages of the messaging infrastructure 112 during communications with other services, such as a service 120 having messaging infrastructure 122. For example, in a case where the orchestration engine 114 is executing a plurality of instances of the local process model 108, the message handler 118 may be responsible for sending messages of the various instances to the appropriate recipients, using appropriate transmission techniques and/or protocols. Conversely, for incoming messages, the message handler 118 may be used to sort and/or route messages to appropriate portions of the messaging infrastructure 112, the service 110, and/or the business application 106.

The message handler 118 also may serve as a buffer or queue for incoming and outgoing messages. In this regard, for example, the message handler 118 may serve as a queue for incoming messages, which may ultimately be forwarded to a message log 124. The message log 124 may be used to track each incoming (and outgoing) message(s), and, ultimately, persist the messages to the message repository 116.

Thus, for example, the process model 108 may describe tasks to be performed, as well as messages that may be sent/received as part of such tasks, by a manufacturer as part of a manufacturing process, or by some other party/entity. As referenced above, such process models generally include a plurality of nodes or tasks that are joined and ordered to obtain a desired result. That is, as illustrated by the example process model 108 illustrated in FIG. 1 (which is intended merely as a conceptualization or illustration of a process model having multiple synchronizations, and not intended necessarily to represent a particular process model being executed in FIG. 1), nodes/tasks may be joined by appropriate edges (arrows) and control tasks (e.g., splits and/or joins) to obtain structures including parallel tasks, iterative tasks, nested loops, or other known task progressions.

In particular, the process model 108 conceptually illustrates a simplified example in which some or all of three parallel tasks 126a, 126b, 126c are synchronized and result in one or more subsequent tasks 128a, 128b. Synchronization is illustrated as occurring at a synchronization point 130, which may represent or be implemented by a gateway or similar workflow construct, examples of which are discussed in more detail, below. As shown, the tasks 126a, 126b, 126c are respectively associated with branches 132a, 132b, 132c. For example, although the simplified process model 108 of FIG. 1 illustrates a single task associated with each branch 132a, 132b, 132c, it will be appreciated that, in practice, a number of tasks may exist that are respectively associated with the branches 132a, 132b, 132c. Similarly, the subsequent tasks 128a, 128b are illustrated as being respectively associated with branches 134a, 134b.

An example of the process model 108 may include, as referenced above, a process for obtaining loan approval from a number of lenders, where each lender is associated with one of the branches 132a, 132b, 132c. That is, three loan requests may be sent in parallel to the three lenders, and when a first response is received (e.g., via the branch 132a), a first synchronization may occur, and a first subsequent branch 134a may be triggered. For example, the first synchronization may be associated with a decision to proceed with the loan process, without yet identifying a lender, so that the subsequent branch 134a may be associated with processes related to the loan that are not lender-specific (such as obtaining an appraisal of an item to be purchased with the proceeds of the loan). Then, when all of the branches 132a, 132b, 132c have been activated (e.g., all responses have been received), then a second synchronization may occur and the second subsequent branch 134b may be activated, so that a specific lender of the three lenders/branches is selected and loan processing continues with the selected lender.

In this context, it may be appreciated that the branches 132a, 132b, 132c may be activated more than once within a given instance of the local process model 108. Moreover, different instances of the local process model 108 may be implemented in an overlapping fashion (i.e., an instance that begins before a previous instance ends). Still further, activations of the branches 132a, 132b, 132c may be dynamic, such as when the branches 132a, 132b, 132c represent a plurality of instances of a single, underlying task (e.g., described in more detail, below, with respect to FIGS. 6 and 7. These and other considerations may be taken into account by the system 100 when performing synchronizations of the branches 132a, 132b, 132c.

For example, a continuous synchronizer 136 may be used by, or in conjunction with, the synchronization point 130 to perform such multiple synchronizations, and to decide between the plurality of subsequent branches 134a, 134b. For example, the continuous synchronizer 136 may be spawned by the orchestration engine 114 as soon as a first one of the incoming branches 132a, 132b, 132c is detected as having been activated. As referenced above, the synchronization point 130 may be implemented as a gateway construct that is known within existing process modeling and/or execution languages, so that, in some example implementations, the continuous synchronizer 136 may be spawned by the orchestration engine 114 and implemented within such a gateway.

The continuous nature of the continuous synchronizer 136 refers to an ability to continuously perform pluralities of synchronizations of the branches 132a, 132b, 132c, as well as of other incoming branches '132n,' not shown in FIG. 1. Such synchronizations may occur over time, as results are determined for the different branches 132a, 132b, 132c. For example, the tasks 126a, 126b, 126c may each be similar or the same for their respective branches 132a, 132b, 132c; however, results of the tasks 126a, 126b, 126c may become available over a period of time which may be difficult to define or specify, such as in the loan request example above, in which lender replies may arrive on an as-available basis from the corresponding lenders. For example, as just referenced, the continuous synchronizer 136 may cause a first synchronization after a first subset of the branches 132a . . . 132n have been activated (which, again, may occur over some potentially lengthy and difficult-to-predict time period), and may cause a second synchronization after a second subset of the branches 132a . . . 132n have been activated, and so on with a third or higher number of subsets/synchronizations. This ability to perform such continuous synchronizations allows the system 100, as referenced above, to contemplate and execute a variety of real-world scenarios using parallel processes, examples of which are described herein, and which may include purchase order processing or business tendering, or other examples in which a number of interactions are required through different and distributed actors (e.g., external parties).

In performing multiple synchronizations and deciding between multiple outgoing branches (and subsequent tasks), the continuous synchronizer 136 may access model instance data 138, as well as evaluation rules 140. In this context, the model instance data 138 may refer, for example, to virtually any data that is specific to, or associated with, an executing instance(s) of the process model 108. For example, the model instance data 138 may be associated with state data regarding a current state of the synchronization point 130 (e.g., gateway), or other workflow processing data associated with the executing instance(s) of the process model 108.

In the example of FIG. 1, the model instance data 138 includes workflow data 142 and branch data 144. Further examples of the workflow data 142 and the branch data 144 are provided in more detail, below, but, in general, the workflow data 142 may refer to data that are associated with the executing instance of the process model 108. For example, if the process model 108 is associated with a loan approval process, there may be general rules that are associated with the process model 108 as a whole (and these rules may be included in the evaluation rules 140). For example, if the process model is related to technical control data (e.g., for controlling mechanical or electromechanical sensors and actuators), then the evaluation rules 140 may relate to general properties and uses of the devices being used. Meanwhile, in a business-related example, such evaluation rules 140 may be considered to be business rules, and may include how to create and submit loan requests, how to judge resulting loan approvals or rejections, or other concepts and decisions related to loan processing.

In practice, in the former example, such control techniques may be applied in different contexts (e.g., controlling different parameters, such as pressure or temperature, and at different levels). Similarly, in the latter example, such loan processing may be related to different contexts, such as when the loan being obtained is for the purchase of a first car versus the purchase of a second car (so that different loan criteria or amounts may be contemplated as between these two instances). Thus, the workflow data 142 may be different between instances of the process model 108, and, as described below, different actions may be taken by the continuous synchronizer 136 within the different instances, based on such differences in workflow data 142.

Meanwhile, the branch data 144 refers generally to information about the branches 132a, 132b, 132c that are associated with the synchronization point 130 and the continuous synchronizer 136. Such information may include a number or count of the branches that exist and that have or have not been activated, as well as information identifying which of the branches 132a, 132b, 132c have been activated.

In some implementations, as described below in more detail, for example, with respect to FIG. 3, the branches 132a, 132b, 132c may define an activation cycle in which each of the branches 132a, 132b, 132c is activated once and only once, until all of the branches 132a, 132b, 132c have been activated, at which point the synchronization point 130 and the continuous synchronizer 136 may reset and begin a next activation cycle (with a corresponding, subsequent plurality of synchronizations of the branches 132a, 132b, 132c). As described herein, within such an activation cycle, the synchronization point 130 and the continuous synchronizer 136 may execute two or more synchronizations of the branches 132a, 132b, 132c.

In practice, the continuous synchronizer 136 may include a branch manager 146 that monitors, detects, and otherwise manages information about the branches 132a, 132b, 132c, including management and tracking of the activation cycle(s), just referenced. For example, the branch manager 146 may be configured to detect activation of any of the plurality of incoming branches 132a, 132b, 132c of the workflow process at the synchronization point 130, and may be configured to identify an activated branch from among the plurality of incoming branches 132a, 132b, 132c. That is, since the tasks 126a, 126b, 126c operate in parallel, the branches 132a, 132b, 132c may activate independently of one another, and in any order. The branch manager 146 may thus detect (and record in the branch data 144) not only that a given number of the branches 132a, 132b, 132c have been activated, but may identify and record which particular ones of the branches 132a, 132b, 132c have been activated, and when, e.g., within a given activation cycle. In this way, the branch manager 146 also may determine and record workflow data associated with each one of the branches 132a, 132b, 132c, within the workflow data 142.

A flow condition evaluator 148 may be associated with a plurality of synchronization conditions, and may be configured to evaluate at least one such synchronization condition as being fulfilled, based on the activation and identification of the branch(es), including the identified, activated branch. For example, the flow condition evaluator 148 may be associated with a one or more synchronization expressions, and every time one of the branches 132a, 132b, 132c is activated, detected, and identified, the flow condition evaluator 148 may evaluate the (current) synchronization expression to determine whether a synchronization condition has been met, perhaps using the workflow data 142 and/or the branch data 144.

For example, the synchronization expression may be determining that some defined number or percentage of the branches 132a, 132b, 132c has been activated, whereupon a first synchronization may take place. For example, as referenced above, the synchronization condition may be that a first one of the branches 132a, 132b, 132c is activated, whereupon the synchronization point 130 and/or continuous synchronizer 136 may execute a synchronization and begin selection of a subsequent, outgoing branch 134a or 134b, using, e.g., a branch condition evaluator 150 and the evaluation rules 140, as described in more detail below.

Then, a secondary synchronization condition may later occur, e.g., after a second, larger number or percentage of the branches 132a, 132b, 132c has been activated. For example, the flow condition evaluator 148 may determine that all three of the branches 132a, 132b, 132c have been activated, using the branch data 144, and may execute a secondary synchronization, thereby causing the branch condition evaluator 150 to select, in this example, the other of the outgoing branches 134a, 134b that was not previously selected (or, in other example cases, to select a different outgoing branch, 134n, not shown, or even to select the original branch 134a again).

As referenced above, such multiple synchronizations allow for flexible and more complete descriptions of real-world processes. For example, a first action may be taken after a first threshold of activated branches is reached, while a second and different action may be taken after a second threshold of the activated branches is reached. Further, through the use of the workflow data 142, branch data 144, and evaluation rules 140, complex and detailed conditions may be defined and evaluated, both to determine whether synchronization should take place at all (e.g., using the flow condition evaluator 148), and to determine (once a synchronization has occurred) which of a plurality of outgoing branches should be activated (e.g., using the branch condition evaluator 150).

As referenced above, a number of different types of languages may be used both to design/create process models, and also to execute the process models, such as the process model 108. In the examples that follow, the modeling language Business Process Modeling Notation (BPMN) is used as an example of a language that developers and designers may use to create the process model 108. As is known, BPMN provides intuitive, graphical interfaces, with which designers (even non-technical or business designers) may easily create the process model 108. More specifically, the created BPMN-based model may be transformed or converted into a format that is executable by the orchestration engine 114, such as an executable language like BPEL, referenced above, for executing instances of the process model 108 (including the continuous synchronizer 136).

In BPEL, and in other contexts and languages, activation of branches may be referenced or described as passing or routing a control token(s) associated with the branch(es). For example, if the branch 132a is the first-activated of the incoming branches 132a, 132b, 132c, the branch 132a may pass a control token to the synchronization point 130, which may result in the orchestration engine 114 and/or the synchronization point 130 spawning the continuous synchronizer 136, whereupon a token handler 152 of the branch manager 146 may be responsible for receiving, tracking, and storing the token, as well as subsequent tokens that are received from the incoming branches 132b, 132c (and other incoming branches, not shown in FIG. 1). More specific examples of such tokens are provided below with respect to FIGS. 3-7. In general, though, any triggering of an interface(s) of the synchronization point 130 may be considered to provide such an activation or token.

In the example of FIG. 1, in association with a branch identifier 154, the token handler 152 may save tokens within the branch data 144 as being associated with specific, identified ones of the branches 132a, 132b, 132c, which, as referenced above, helps allow the flow condition evaluator 148 to obtain and evaluate state data related to the executing instance of the process model 108, and to perform synchronizations based thereon. Similarly, the branch condition evaluator 150 may pass a control token to a selected one of the outgoing branches 134a, 134b, as referenced above, perhaps based on a branching condition that the branch condition evaluator evaluates, e.g., based on the evaluation rules 140.

Although FIG. 1 is discussed in terms of business processes associated with the illustrated global process model 102, the business application 106, the local process model 108, as well as the various service and messaging systems, it will be appreciated that FIG. 1 is only an example context. For example, the term business application should be interpreted broadly as including any application that is used in profit generation of some sort, although the business application 106 also may refer to non-profit endeavors as well, including, for example, schools, churches, charities, hospitals, or virtually any other organization. Further, the business application 106 is merely an example, and other applications, such as applications for personal use, also may be used. Consequently, the continuous synchronizer 136 may be used in virtually any scenario in which parallel activities or tasks, e.g., which execute in parallel but which may initiate or complete at different times, and which may benefit from multiple, partial synchronizations as initiation/completion occur(s), may be controlled so as to best represent real-world scenarios in which such different synchronizations may provide a benefit, in association with evaluation and selection between two or more outgoing branches which may be included after the synchronization(s) of the parallel tasks.

Figure 2:
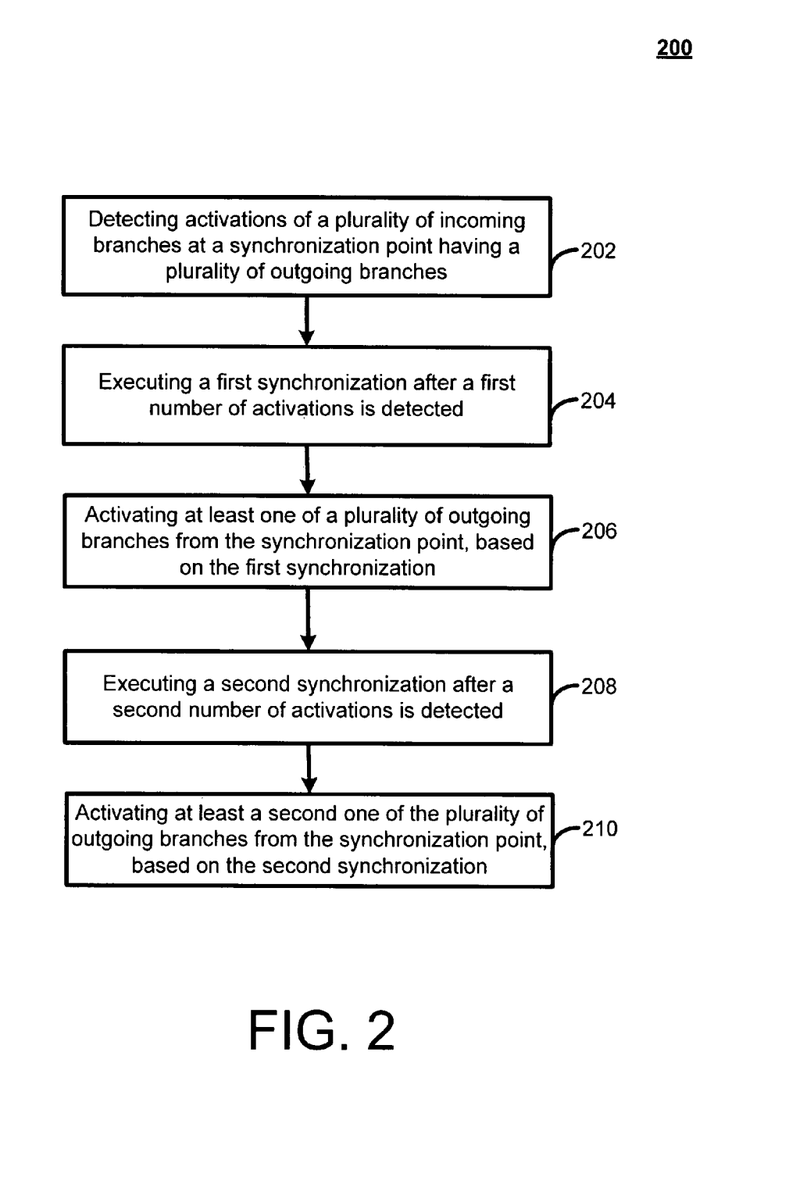
FIG. 2 is a flowchart illustrating example operations of the system of FIG. 1.

FIG. 2 is a flowchart 200 illustrating example operations of the system 100 of FIG. 1. Thus, FIG. 2 again relates to examples associated with the coordination of distributed, parallel activities which collectively serve to determine which direction a process, such as the process model 108, should take from the synchronization point 130. That is, as described herein, FIG. 2 relates to parallel processing and partial synchronizations, in which multiple branches, such as the incoming branches 132a, 132b, 132c, initiate actions (such as the sending of messages using the messaging infrastructure 112) to respective parties (such as the service 120 and messaging infrastructure 122), and then wait and receive outcomes from the parties (e.g., receiving response messages). As described, multiple synchronizations may occur as such outcomes are received, so that different numbers or types of such outcomes may ultimately trigger different or multiple ones of the outgoing branches 134a, 134b of the synchronization point 130.

Thus, in FIG. 2, activations of a plurality of incoming branches may be detected at a synchronization point having a plurality of outgoing branches (202). For example, the orchestration engine 114 and/or the branch manager 146 may detect activations of the plurality of incoming branches 132a, 132b, 132c, at the synchronization point 130 having the plurality of outgoing branches 134a, 134b. The orchestration engine 114 may detect a first activation of a first of the incoming branches 132a, 132b, 132c, and spawn an instance of the continuous synchronizer 136 in response thereto, whereupon the branch manager 146 may proceed with detecting and classifying further activations of the branches 132a, 132b, 132c, e.g., for storage in the branch data 144. As described, an activation of a branch may be detected as receipt of a token therefrom, so that the branch data 144 may be represented in terms of such tokens, as described below, for example, with respect to FIG. 3.

A first synchronization may be executed after a first number of activations is detected (204). For example, the flow condition evaluator 148 may be associated with one or more synchronization conditions or expressions. Every time the branch manager 146 (e.g., the token handler 152) detects activation of one of the branches 132a, 132b, 132c, within an activation cycle thereof, the flow condition evaluator 148 may evaluate the (current, associated) synchronization condition or expression, perhaps based on the workflow data 142 and/or the branch data 144.

At least one of a plurality of outgoing branches from the synchronization point may be activated, based on the first synchronization (206). For example, if the flow condition evaluator 148 evaluates a synchronization condition to be true in association with an activated branch, so that it is decided that a synchronization will occur, then the branch condition evaluator 150 may assume responsibility for deciding which of the plurality of outgoing branches 134a, 134b will be selected for further processing, e.g., based on the evaluation rules 140.

At least a second synchronization may then be executed after a second number of activations is detected (208). For example, as further activations of remaining ones of the branches 132a, 132b, 132c occur within an activation cycle thereof, the flow condition evaluator 148 may continue to evaluate current synchronization conditions associated with the currently-activating branch(es) (where the synchronization conditions may be different for the second synchronization than for the first synchronization).

At least a second one of the plurality of outgoing branches from the synchronization point may be activated, based on the second synchronization (210). For example, as before, the branch condition evaluator 150 may evaluate the same or different business rule(s) 140 in order to select one of the outgoing branches 134a, 134b (which may be the same or different from the previously-selected outgoing branch(es) 134a, 134b.

By way of more specific example, a business tendering situation may occur in which a warehouse storing goods for delivery may need to accommodate a larger load than the warehouse may be equipped for. Consequently, at least a portion of an associated workflow process (such as the process model 108) may be used to find, and to send messages to, two, three (or more) other warehouses, for assistance with storing the goods in question. Then, responses may be gathered, although, as referenced in examples below, it may be difficult or impossible to determine whether or how many responses will ultimately be received (i.e., to determine whether, when, and how any of the branches 132a, 132b, 132c are activated).

Nonetheless, it will be appreciated from the above description that not all branches 132a, 132b, 132c need be activated for the first synchronization to occur, e.g., once a certain number or threshold of the responses have been obtained, a first synchronization may occur in which steps may be taken to commence a decision making process for selecting from among the responses. Then, when a further number or threshold of responses is obtained, a secondary synchronization may occur in which the decision may be made to proceed with, and use, a particular storage provider associated with the evaluation rules 140. In this way, for example, the decision making process may be begun relatively early, even before the decision on a storage provider is actually made, so that the process as a whole may be expedited and improved.

Figure 3:
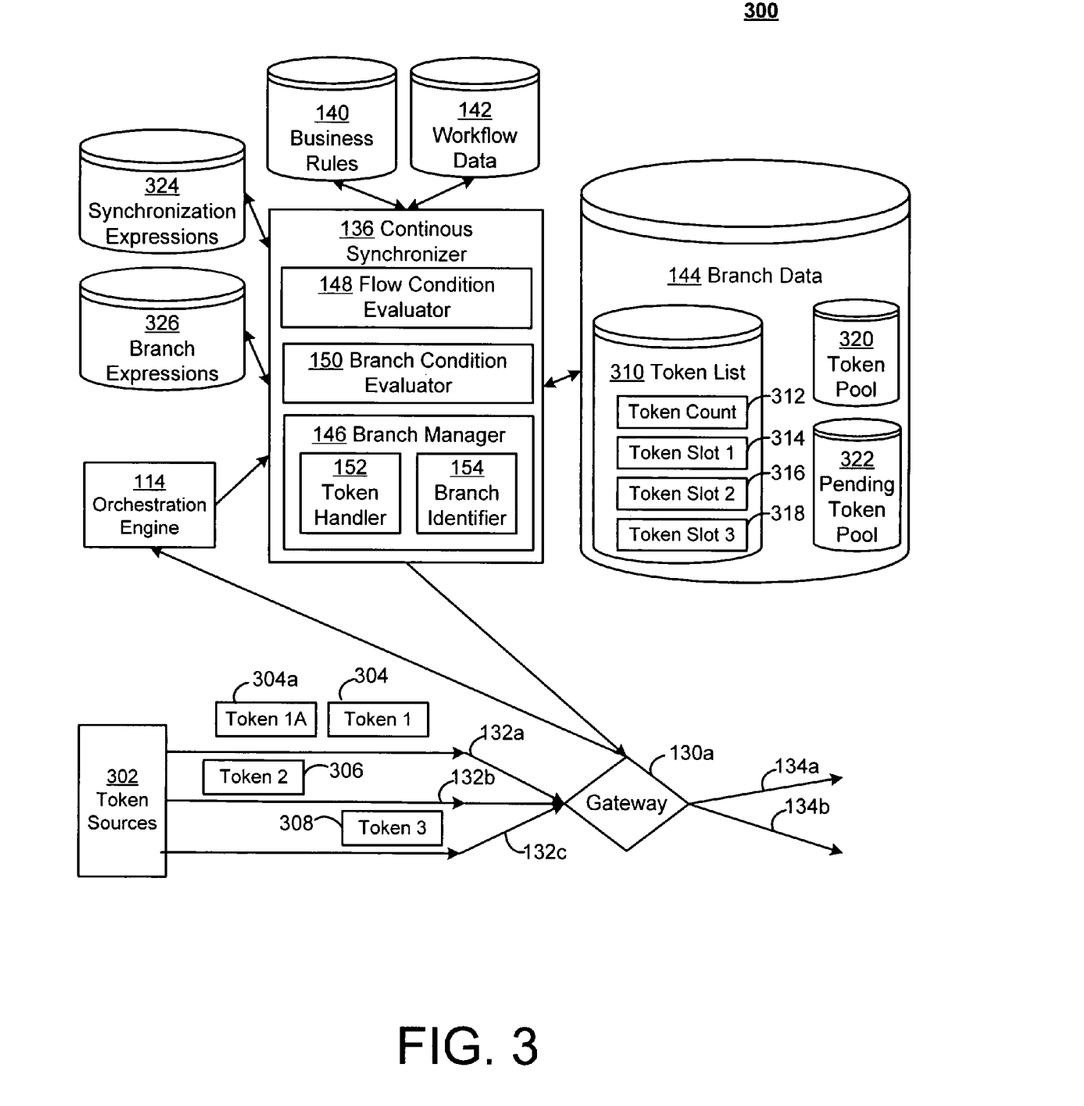
FIG. 3 is a block diagram of an example implementation of the system of FIG 1.

FIG. 3 is a block diagram 300 of an implementation of the system 100 of FIG. 1. In FIG. 3, several of the elements are the same or similar to elements of FIG. 1, as indicated by like reference numerals. It will be appreciated from FIG. 3, however, that the continuous synchronizer 136 and related elements may be implemented in different environments than the example environment of FIG. 1. For example, the continuous synchronizer 136 need not be associated with some or all of the service 110, messaging infrastructure 112, or global process model 102, or may be implemented with different versions or types of these or other elements of FIG. 1.

In FIG. 3, then, a specific example is illustrated in which token sources 302 generically and conceptually represent various activities/tasks that are associated with executing instances of one or more process models, such as the process model 108 of FIG. 1. Consequently, each of the branches 132a, 132b, 132c, or other branches 132n (not shown in FIG. 3) may be activated in conjunction with a token for that branch. Multiple activations upstream in the process model 108 may thus lead to two tokens flowing in the same branch, where two corresponding activations may occur, for example, through two iterations or multiple instances of an activity or task in question.

For example, as shown, the branch 132a may receive "token 1" 304 and "token 1A" 304a from the branch 132a, while "token 2" 306 and "token 3" 308 are received on the branches 132b, 132c, as shown. Then, for the three branches 132a, 132b, 132c that are shown, an activation cycle of the three branches 132a, 132b, 132c may be determined, in which a gateway 130a ensures that at least one token is received at each incoming branch 132a, 132b, 132c within each such activation cycle.

For example, a token list 310 may be used to track both a count of the tokens (using token count 312), as well as an identity of the token(s) or of the identity of the source branches in question (using token slots 1, 2, and 3, corresponding to the three incoming branches 132a, 132b, 132c). When the token handler 152 receives the "token 1A" 304a that is not a part of the current activation cycle, then such tokens, such as the "token 1A" 304a, then the token handler 152 may cache such tokens as being tokens that are outside of the current activation cycle, e.g., using a token pool 320 and a pending token pool 322 (described in more detail, below, e.g., with respect to FIG. 4). Then, once the current activation cycle is completed, the continuous synchronizer 136 may proceed with the cached tokens and other currently-received tokens which correspond to the next activation cycle.

A general operation of the system 300 may be understood from the above description of FIG. 1. For example, as tokens 304, 306, 308 arrive at a synchronization point, shown in FIG. 3 as a gateway 130a, the token handler 152 may populate the token list 310 (e.g., may increase the token count 312 and populate a corresponding token slot 314, 316, 318), using identifications of the tokens with their respective branches 132a, 132b, and 132c, as provided by the branch identifier 154. It may be appreciated that these actions may occur without regard to an order of initiation, operation, or completion of the tokens 304, 306, 308 within the activation cycle in question. For example, as shown, the "token 3" 308 may arrive first, then the "token 1" 304, followed by the "token 1A" 304a (which follows "token 1" 304 on branch 132a and is therefore part of the next activation cycle), followed finally in this example by the "token 2" 306. This corresponds to real-world situations, in which an order of replies from message recipients will be received, and in which a following instance of the process model 108 may be begun before a current instance fully completes.

As tokens are received and branches identified as having been activated, the workflow data 142 also may be populated. For example, in a loan approval process, the "token 3" 308 may arrive and may be associated with a response from a lender that includes specific details or data from the lender, e.g., interest rates, loan terms, or other loan parameters. Such data may be saved within the workflow data 142 for evaluation by the flow condition evaluator 148 and the branch condition evaluator 150.

For example, as referenced with respect to FIG. 1 and as shown in FIG. 3, synchronization expressions 324 may be accessed by, or associated with, the continuous synchronizer 136. Such synchronization expressions 324 may be defined during design time by a designer, either explicitly or implicitly. For example, when using a GUI-based tool to design the process model 108, a designer may create the parallel structures of the incoming branches 132a, 132b, 132c, the synchronization point 130, and the outgoing branches 134a, 134b, and may be given an opportunity to define the synchronization expressions 324 as part of the process (e.g., when defining the synchronization point 130 or the gateway 130a).

In other examples, simply by making certain choices of message recipients and process scenarios, the synchronization expressions 324 may be automatically derived or determined, at least in part. For example, in the loan example above, there may be certain elements, or conditions that are associated with loan processing, and which may therefore be included (or offered as options for inclusion) within the synchronization expressions 324. Specifically, for example, loans from very high-rate or risky lenders may be associated with a large threshold of replying lenders that is required before a synchronization may be made, or, conversely, if the lenders are more reputable, then fewer may be required before a given synchronization occurs.

Availability of the branch data 144, workflow data 142, and other state data that may be available, means that the synchronization expressions 324 may be expressed and evaluated in many different forms and formats, and complex expressions may be used. For example, as referenced above, rather than expressing a simple threshold, the synchronization conditions may be expressed in terms of ranges or percentages of incoming branches 132a . . . 132n that have been activated (i.e., for which tokens have been received). For example, if a current token count and maximum token count are known, then thresholds may be defined in terms of percentages (e.g., synchronization occurs after 33% of tokens have been received within an activation cycle).

As further examples, the workflow data 142 allows for complex synchronization expressions 324. For example, the synchronization expression may require that 50% of tokens are received, and that 100% of these are associated with some criteria stored in the workflow data 142 (e.g., in the loan scenario, have interest rates below a certain threshold). More generally, virtually any Boolean expression may be included within the synchronization expressions 324 and evaluated by the flow condition evaluator 148 as tokens are received (e.g., AND conditions, OR conditions, or NOT conditions).

Similarly, once a synchronization condition has been evaluated to 'true,' branch expressions 326, which again may be complex expressions, may be implemented to allow the branch condition evaluator 150 to select between the outgoing branches 134a, 134b. For example, the branch expressions 326 may map the evaluation rules 140 to the current state of the gateway 130a, the branch data 144, or the workflow data 142. Specifically, for example, the evaluation rules 140 may include criteria for evaluating certain loan offers, and specific ones of these criteria may be included within the branch expressions 326, so that the branch condition evaluator 150 may effectively map the current conditions to desired ones of the evaluation rules 140 for selection between the outgoing branches 134a, 134b (or 134n, not shown).

The systems of FIGS. 1 and 3 are capable of even more complex synchronization behaviors, examples of which are provided below. For example, it may occur that later synchronization expressions 324 are updated or changed based on evaluations of earlier synchronization conditions (and similarly for branch expressions 326). Further, the evaluation rules 140 also may be updated in a dynamic manner, e.g., depending on an outcome(s) of earlier synchronizations.

For example, the evaluation rules 140 and branch expressions 326 may be defined based on certain assumptions about how the execution of an instance of the process model 108 may turn out (for example, that a very low percentage of recipients are expected to respond, or that recipients will be of a low quality, reputation, or credit rating). If these assumptions turn out to be wrong, e.g., if a large number of responses are received, or if a very high quality of responses are received, then the evaluation rules 140 and/or the branch expressions 326 may be updated accordingly, so that, for example, a smaller or larger number/percentage of tokens are required for a subsequent synchronization.

Thus, and as referenced above, activations of branches may be performed dynamically, such as through the use of the multiple instances construct or concept (e.g., described in more detail below with respect to FIGS. 6 and 7). For example, it may be that several instances of a task or activity are created, so that additional or further tasks may be created before the previously-created ones have completed. Under such dynamic activations of instances, then expressions for evaluating synchronizations may be allowed to change, directly or indirectly. For example, a branch condition(s) may be evaluated against a current context of the process model and instance(s) to yield an expression, which may be the same as, or different than, a previous expression(s) for performing the synchronization(s).

Many other examples of whether and how the evaluation rules 140 or other data of FIG. 3 may be updated in a dynamic fashion, some of which are discussed below. Such updates may be implemented by, or based on, actions of the branch manager 146, the flow condition evaluator 148, or the branch condition evaluator 150, as may be appropriate or desired. In some cases, updates to the evaluation rules 140 may be specified at design time, while in other cases, run-time modifications may be made, based on current execution conditions and results of the executing instance(s).

Figure 4:
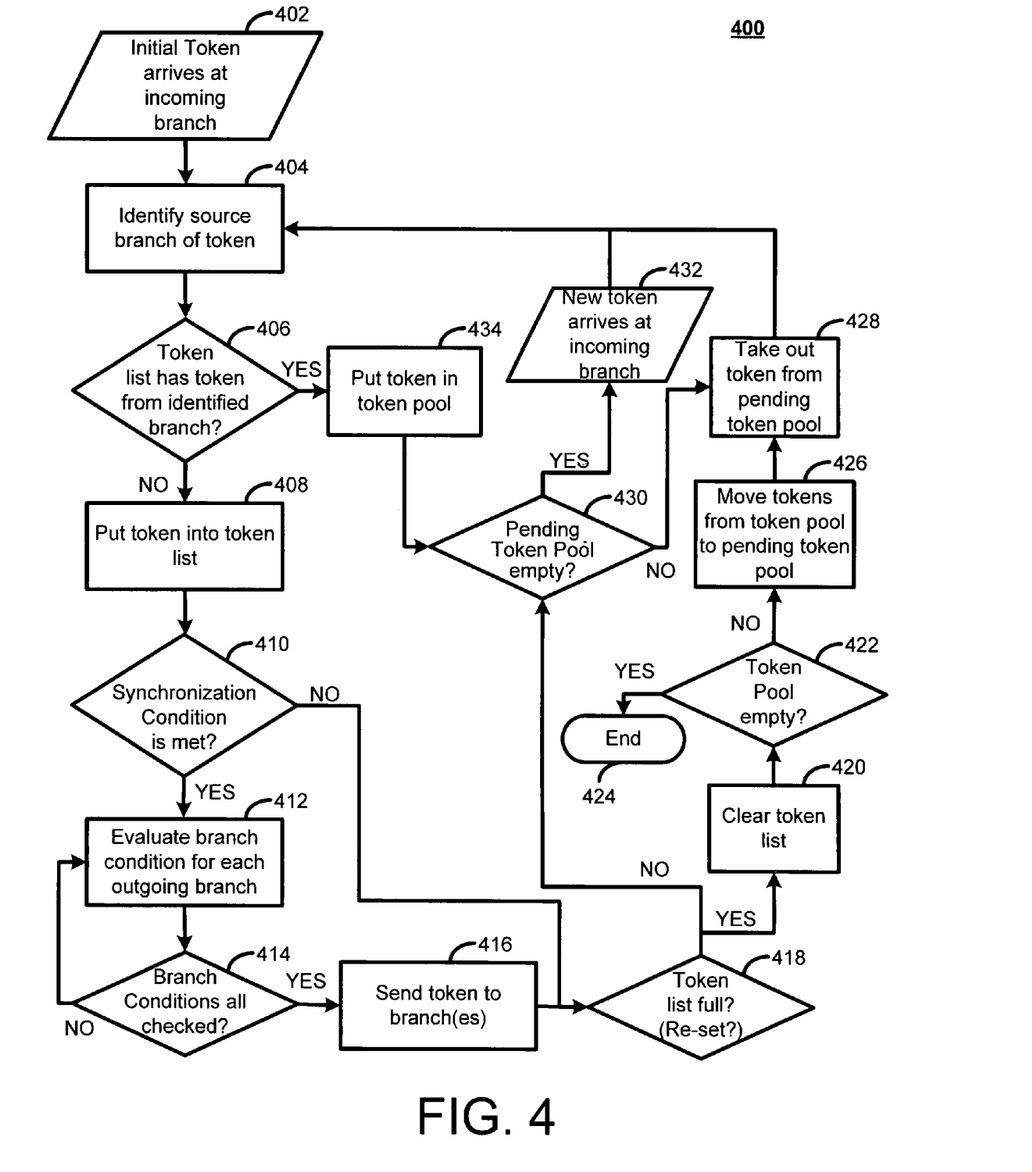
FIG. 4 is a flowchart illustrating example operations of the system of FIG. 3.

FIG. 4 is a flowchart 400 illustrating example operations of the system 300 of FIG. 3. In the example of FIG. 4, an initial token arrives at an incoming branch (402), such as when the "token 3" 308 arrives at the branch 132c and at the gateway 130a of FIG. 3. As described above, this first token that arrives at one of the incoming branches 132a . . . 132n operates to trigger an instantiation of the continuous synchronizer 136. All further triggers (e.g., further incoming tokens) may be processed by this instance of the continuous synchronizer 136.

For the received token, a source branch of the token may be identified (404). For example, the branch identifier 154 may determine that the "token 3" 308 is identified as being associated with the incoming branch 132c.

If the token list 310 does not already holds a token from that source branch (406), then the received token may be placed into the token list 310 (408). For example, the "token 3" 308 may be placed into the token slot 3 318, and the token count 312 may be increased by 1. The token list 310 may be maintained for each instance of the continuous synchronizer 136 and, as described and illustrated, holds a list of tokens, with each token coming from another, incoming source branch. Consequently, there may be at most M tokens for M incoming branches. Further, a full token list 310 occurs when the gateway 130a has consumed at least one token at each incoming branch. .

As described herein, within one activation cycle, e.g., within one cycle of activation of each of the branches 132a . . . 132n, the token list 310 is populated by only one token per branch. Thus, although all received token are consumed, only the first token at an incoming branch (per cycle) may cause immediate effects. Meanwhile, as described herein, further tokens at a branch are stored (cached) in the token pool 320 (434), and taken into consideration in the next cycle(s), after a reset of the continuous synchronizer 136 that occurs after completion of the current (and each) activation cycle.

More generally, an activation cycle may include any scenario in which all branches have been evaluated through the different synchronizations. It may occur that no token flowed on a given branch (such as when an expected reply is not received), or that a single token flows, or more than one token flows (in which case, as described above, the subsequent token(s) may be cached and evaluated as part of a different activation cycle. Thus, an activation cycle includes the processing of inputs for a related activation of the branches from upstream, such as, for example, responses to the same loan or tender request.

Further in response to receipt of the token and determination that the received token is from a branch that has not previously received a token in the current activation cycle, a synchronization condition may be evaluated as being met or not (410). For example, the flow condition evaluator 148 may evaluate the appropriate synchronization expressions 324, using, e.g., the token list 310 and the workflow data 142.

If the synchronization condition is met (410), then a synchronization may occur, and a branch condition is evaluated for each outgoing branch 134a, 134b (412). For example, the branch condition evaluator 150 may evaluate the appropriate branch expressions 326, using, e.g., the evaluation rules 140. As shown, all branch conditions for the various branches may be checked, after which tokens of control may be passed to the selected branches (e.g., branches which evaluate to 'true.' (416).

If, upon receipt of the not-previously received (within the activation cycle) token, the synchronization condition is not met (410), or once the tokens are passed to outgoing branches in response to 'true' branch conditions (416), then the token list 310 may be evaluated as being full or not (418). For example, the token handler 152 or other element of the branch manager 146 may determine whether the token list 310 is full.

If the token list 310 is full (418), then the implication is that the current activation cycle is complete, so that a reset should occur, and accordingly, the token list 310 may be cleared (420), and the gateway 130a is thus cleared and reset, as well.

As referenced above, the token pool 320 refers to a cache or other memory that may be used to store tokens that were received at an incoming branch before completion of the current activation cycle (i.e., before all incoming branches received a token). For example, as shown in FIG. 3, it may occur that the "token 1"A 304a may be received before the "token 2" 306 is received at the gateway 130a, i.e., before completion of the activation cycle of the branches 132a, 132b, 132c that is defined by tokens 304-308.

If no tokens are stored in the token pool, and the token pool is empty (422), then the process ends (422). That is, for example, the instance of the continuous synchronizer 136 may expire, and new instance thereof may be created later, if and when a new token of a new activation cycle arrives at the gateway 130a.

If the token pool is not empty (422), e.g., if tokens from subsequent activation cycles have been cached there to wait for the end of the current cycle, then token(s) may be moved, from the token pool 320 to the pending token pool 322 (426). As may be appreciated, for a single cycle there may only be one token pool 320. That is, each token that can not go into the token list 310 (i.e., because there is already a token for that branch within the token list) is stored in the token pool 320. After the reset of the token list 310, all token from the token pool 320 may be taken into account. For example, it may occur that five tokens at one branch (e.g., the branch 132a) were received within one activation cycle. In such as case, the first token would be stored within the token list 310, while four may be stored in the token pool 320. Upon reset of the token list 310 as just described, tokens cached in the token pool may be moved to the pending token pool 322.

Then, the pending token(s) may be taken from the pending token pool 322 for identification of a source branch thereof (404), and the process continues as-described above. Meanwhile, if the token list is, in fact, full (418), then it may be determined whether the pending token pool is empty (430). If not, then, again, a pending token may be removed (428) and forwarded for identification (404). If the pending token pool is empty (430), however, then the process waits for a new token to arrive at an incoming branch (432), and, again proceeds with identification of that branch (404). As referenced above, and illustrated in FIG. 4, the pending token pool 322 may receive tokens, for example, based on an earlier determination that the token list currently holds a token from a currently-identified branch (406).

Also, it may be appreciated in the example of FIG. 4 that no new tokens from incoming branches (432) are identified until tokens from the pending token pool 322 are emptied. Further, it may be appreciated the operation of receiving a new token at an incoming branch for identification of the branch may only occur if no pending tokens are in the pending token list 322, and an unbalanced number of tokens have been received for the incoming branches.

Figure 5:
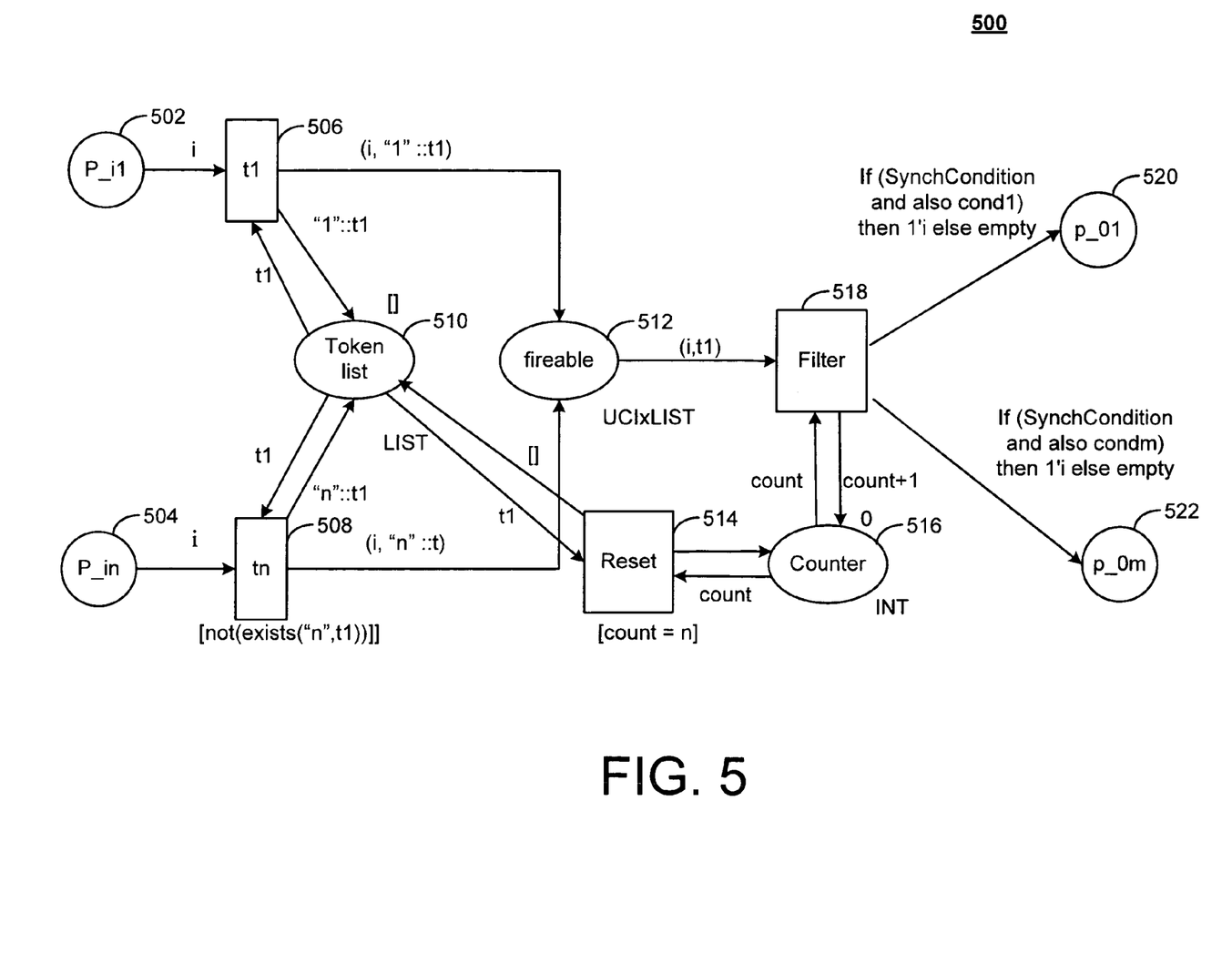
FIG. 5 is a coloured Petri net illustration of a gateway that may be used in the system(s) of FIGS. 1 and 3.

FIG. 5 is a coloured Petri net illustration 500 of a gateway that may be used in the system(s) of FIGS. 1 and 3, e.g., as the synchronization point 130 or the gateway 130a. The Petri net refers generally to a known modeling language or technique in which arcs (direct arcs) may run between "places" and "transitions," where the transitions are referred to as having either "input places" (if leading to a transition by way of an arc) or "output places" of the transition (if receiving an arc from a transitions). Such Petri nets may be used to model actions associated with workflow processing, or, in this case (as just referenced) particular constructs within process models, such as the gateway 130/130a. In this case, the places of the Petri net may contain tokens, so that transitions may be said to respond to input tokens by "firing," where an enabled transition may fire if there are tokens in each input place of the transition. When firing, a transaction uses tokens from its input places, executes any associated processing, and puts tokens into the various output places. In standard Petri nets, such tokens are indistinguishable from one another, while coloured Petri nets provide an extension in which each token has a specific value, where such values may be used to base expressions and make decisions.

In the example of FIG. 5, then, the coloured Petri net 500 shows exactly two incoming and two outgoing branches for the gateway 130a, represented with 'p_i1' 502, 'p_in' 504, 'p_o1' 520, and 'p_im' 522. Of course, it will be appreciated that the same or similar mechanism may apply for an arbitrary number of incoming and outgoing branches.

In FIG. 5, whenever a token comes in at a branch (e.g., a token in 'p_i1' 502 or 'p_in' 504), the token may be processed by the gateway 130a if no token was processed for that branch before, as described herein. When it is processed, corresponding transition t1 506 or tn 508 fires, and puts a unique token into the token list "t1" 510.

As described herein, the token list 510 represents the branches which have already consumed a token. An empty list "[ ]" therefore means no token. Meanwhile, a guard condition "[not(existsts("X",t1))]" prevents a transition from firing if the transition has already processed a token (i.e., if there is already a token in the list for that transition).

When processing an incoming token transition "t1" 506 or "tn" 508, a token may be put into place "fireable" 512. The token may carry a case identifier and a copy of the token list 510 (e.g., the token list 310 of FIGS. 3-4) as it was put back into the place token list 510 after the transition fired. All fireable tokens are processed by the transition filter 518. When the filter transition 518 fires, the counter 516 is increased, indicating the number of tokens that have been completely processed by the gateway 130a, and the branch expression for each outgoing branch (e.g., cond1 for output place "p_o1" 520 or condm for output place "p_0m" 522) is evaluated. Only if the synchronization condition and the branch condition both evaluate to true may a token be put into place "p_o1" 520 or "p-om" 522. In the example of FIG. 5, all conditions may reference the status of the gateway 130a at the time the token was processed by "t1" 506 or "tn" 508. Meanwhile, the counter 516 outputs to reset 514 if the activation cycle is completed (and the token list is full), so that the token list 510 and the counter 516 may be reset to zero at the end of the current activation cycle.

Figure 6:
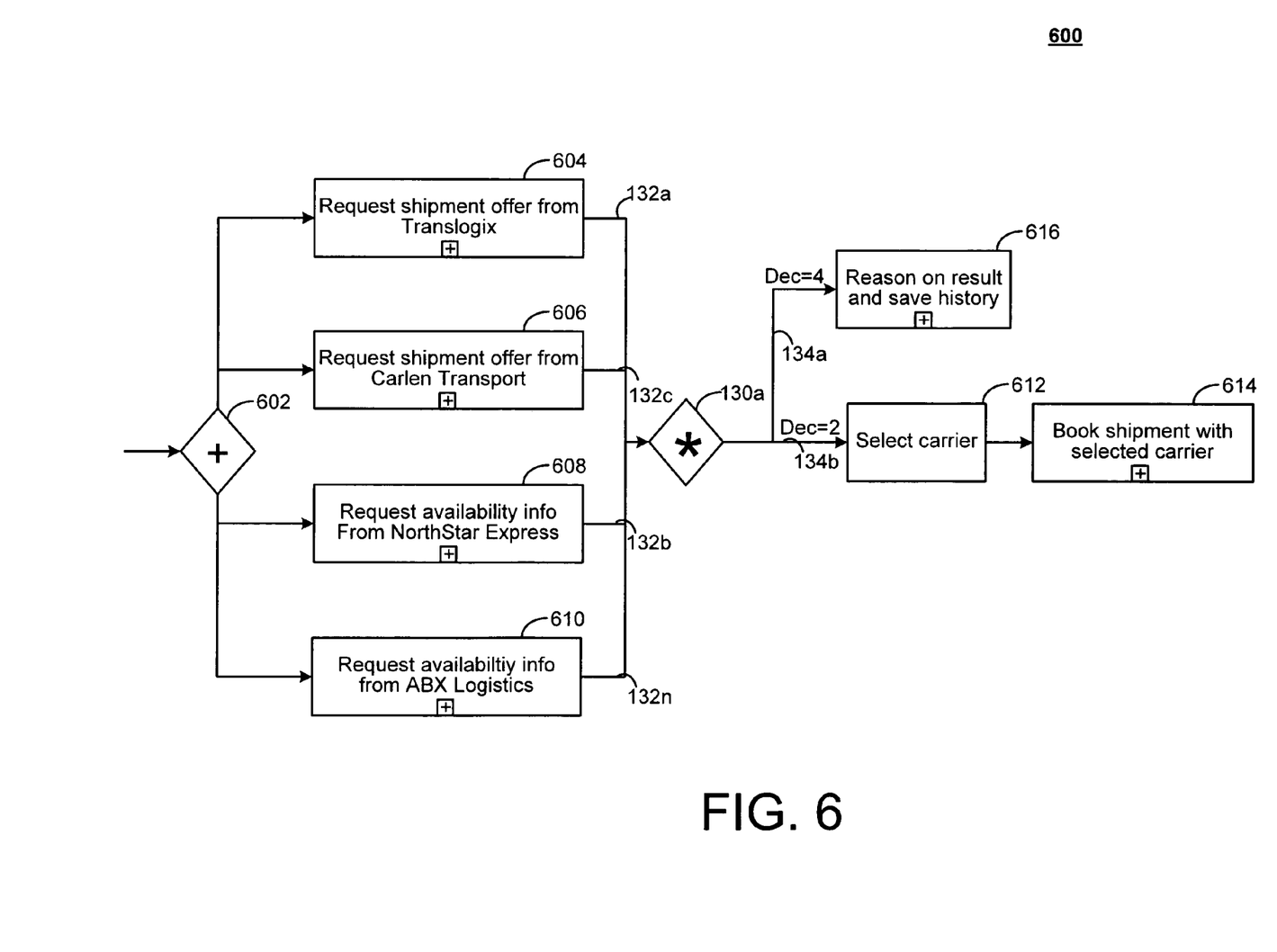
FIG. 6 is a first example process model that may be used in the system(s) of FIGS. 1 and 3.

FIG. 6 is a first example process model 600 that may be used in the system(s) 100/300 of FIGS. 1 and 3. In the example of FIG. 6, a fork or split control flow 602 causes parallel processing of a number of sub-processes 604-610 along branches 132a, 132b, 132c, 132n. That is, the cross within the square at the bottom of elements 604-610 is known, e.g., within BPMN, to refer to a sub-process, as opposed to a singular task. That is, each of the elements 604-610 generally may refer to requests for shipment, but each such request may include or result in a number of tasks/messages to the various shippers.

The gateway 130a thus illustrates that multiple synchronizations may occur. For example, the flow condition evaluator 148 may evaluate a synchronization condition each time one of the sub-processes 604-610 completes. For example, synchronizations may occur at a threshold of two responses from possible senders, at which point a carrier may be selected (612), which may then be followed by a booking of a shipment with the selected carrier (614). Later, within the same activation cycle, a second synchronization condition may be evaluated and found to be true, such as that four (or 'all') responses have been received. In this case, a second sub-process may proceed that may include reasoning on results and saving history accordingly (616).

With reference to the present description, and to FIG. 6 in particular, it will be appreciated that various process modeling, design, and execution techniques contemplate various types of synchronizations or joining of parallel tasks or branches. For example, a number of "workflow patterns"

have been proposed that describe, in a standardized manner, recurrent problems and proven solutions/techniques that may occur in process-oriented design. Various ones of these workflow patterns are associated with executions of parallel tasks. For example, a workflow pattern known as the discriminator contemplates such parallel tasks, and waits for one (and only one) of these to activate before a single, subsequent task is executed. Somewhat similarly, the N-out-of-M join pattern contemplates "M" parallel tasks, and waits for some number "N" of these to complete before firing a single, subsequent task.

The continuous synchronizer(s) of FIGS. 1-6 encompasses both of these scenarios, and others (e.g., workflow patterns including the synchronization pattern, the multiple-merge pattern, the structured discriminator, the blocking discriminator, the structured N-out-of-M join, and the blocking N-out-of-M join, all of which, by themselves, are known in the art and are not further described here), and allows for increased flexibility and utility of process models. For example, in the example of FIG. 6, the process may continue with selection of a carrier (614) after some initial threshold of activated branches is reached, as described, while some later threshold of activated branches triggers a second synchronization for the tasks of reasoning on the results of the process as a whole. For example, by examining the results as a whole, a designer may later determine that it would be preferable to wait for a larger number of responses before proceeding, or may determine, conversely, that similar results may be obtained without waiting for as many responses. Thus, later executions of the process may be improved. For example, the evaluation rules 140 may be updated, based on the results of this reasoning.

Figure 7:
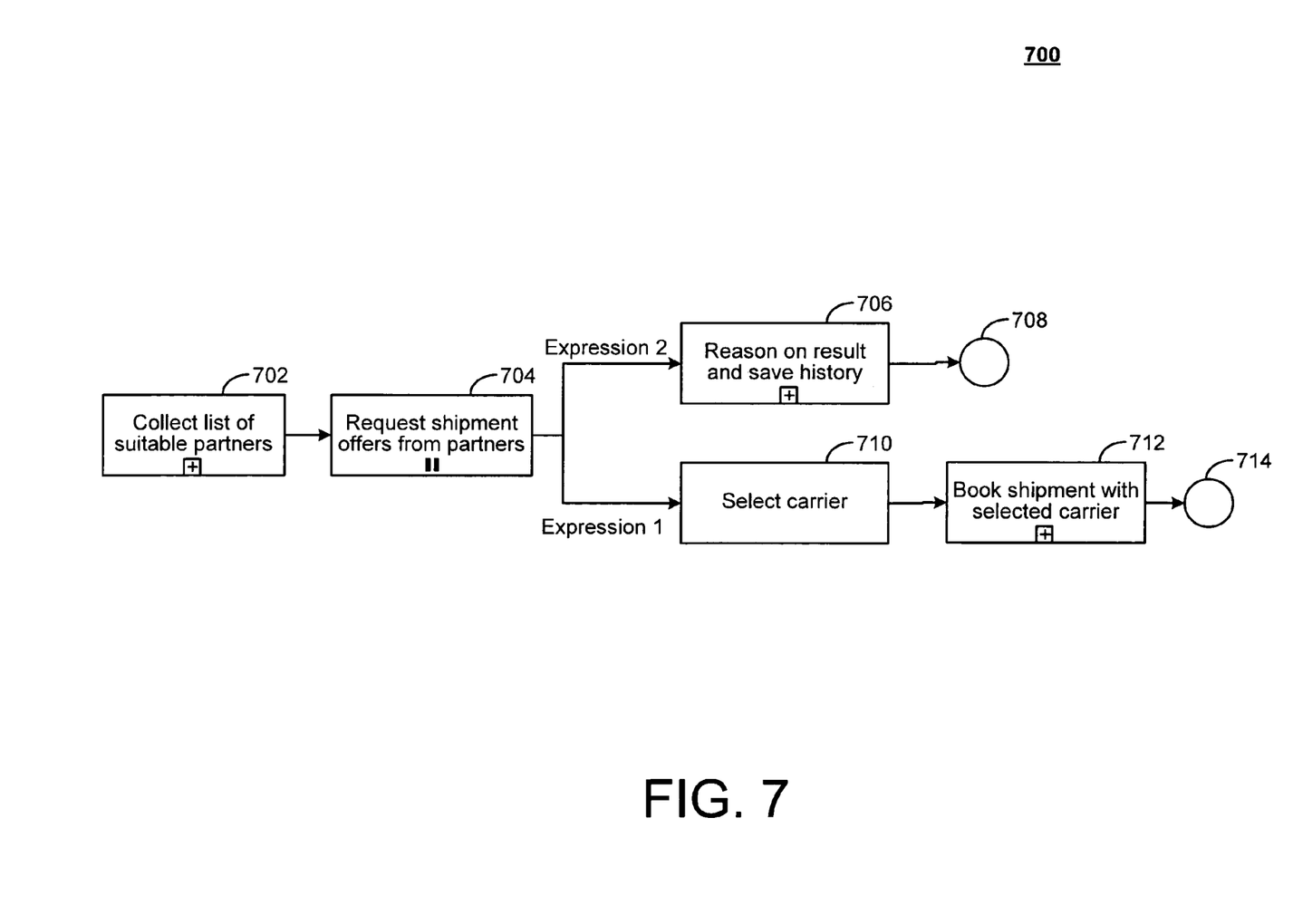
FIG. 7 is a second example process model that may be used in the system(s) of FIGS. 1 and 3.

FIG. 7 is a second example process model 700 that may be used in the system(s) of FIGS. 1 and 3. In the example of FIG. 6 and in earlier examples, illustration and discussion is given with respect primarily to parallel processes, e.g., parallel activities. Similarly, it is also known, and illustrated in FIG. 7, that the same activity may be called and executed multiple times, which may be referred to as multiple instances of that activity within the larger instance of the process model 108.

Thus, it may occur that all involved partners share the same interface, and may thus be called using the same activity which is executed multiple times in parallel (for each partner). In a first example implementation of FIG. 7, the list of partners is not fixed, and its length is not known at design time. Instead, at runtime, the list is collected by a previous process step 702, and the length of the list is determined by the number of partners to be contacted. Then, shipment offers are requested from partners (704), where the vertical, parallel lines in the task 704 indicate a multiple instance of a task; in this case, the task of requesting shipment(s) from partners.

In a first example, a first expression "expression 1" is evaluated such that after 50% of the contacted partners have responded, a carrier is selected (710), and the shipment is booked (712). Based on evaluation of a second expression "expression 2," after 100% of the contacted partners have responded, as in FIG. 6, results are saved for reasoning/analysis.

In a second example of FIG. 7, it is assumed that, instead of contacting each carrier, the shipment opportunity is announced to a public channel, and responses are awaited, i.e., within a multiple instances activity for which it is unknown how many instances will ultimately exist. Therefore the MI activity may be associated with the ability have an unbound number of inner activity instances. Thus, each time a shipment offer is sent to a partner, a new 'collect shipment offer' instance may be started. In an example, once at least 10 offers are available and at least one meets the requirements set by a threshold percentage variable, the carrier may be selected (710). Then, after all instances are complete as judged/required by expression 1, again, results may be saved and analyzed (706).

It may thus be appreciated that, even for the same or similar control flow requirements, synchronization conditions/expressions may have varying levels of complexity. For example, in the first example just given, it may occur that, as referenced, a number of instances (e.g., shipment requests) is not known at design-time, and is not known, in fact, until run-time. In this case, state data of the multiple instances activity 704 may be used, along with workflow data, such as the results produced by already completed instances, in order to determine the actual number of instances.

In still other examples, as in the second example, it may occur that the number of multiple instances is not known, even at run-time (e.g., as in the public invitation example just referenced). In such cases, a completion condition of the multiple instances is relevant, and may, for example, either reference the state at which the multiple instance activity completes, or may replicate the same condition which is used for multiple instance activity completion. For such determinations, state information of the multiple instances activity and workflow/environment data may be used. For example, there may be state information or workflow/environment data that specifies that collection of shipment offers should be closed after 24 hours, or after 2 hours if a carrier was already selected.

In these examples, the relevant expressions (e.g., here, the expression 1 and expression 2) may be required to change atomically, i.e., in an "all-or-nothing" fashion. In this way, for example, a consistency of the process as a whole may be maintained.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data.

Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including:
   at least one processor;
   a non-transitory computer-readable storage medium including instructions executable by the at least one processor, the instructions configured to implement,
   a workflow process comprising at least one synchronization point, wherein the synchronization point includes a plurality of incoming branches and a plurality of outgoing branches, and each outgoing branch is associated with a respective branch condition;
   a branch manager configured to cause the at least one processor to detect activation of any of the plurality of incoming branches and configured to record which incoming branches have activated as part of a current activation cycle of the synchronization point, wherein each of the plurality of incoming branches activates exactly once in an activation cycle, and the activation cycle is complete when each of the plurality of incoming branches is recorded as being activated;
   a flow condition evaluator configured to cause the at least one processor to determine a first synchronization condition as being fulfilled, based on the detection of a first number of the plurality of incoming branches as being activated; and
   a branch condition evaluator configured to cause the at least one processor to determine a first one or more of the branch conditions as being satisfied in response to the first synchronization condition being fulfilled, and to perform a first activation of the one or more of the outgoing branches associated with the first satisfied branch conditions;
   wherein the branch manager is further configured to detect a second number of the plurality of incoming branches as being activated after performing the first activation, wherein the flow condition evaluator is further configured to determine fulfillment of a second synchronization condition in response to the branch manager detecting the second number of the plurality of incoming branches as being activated, wherein the branch condition evaluator is further configured to determine a second one or more of the branch conditions as being satisfied in response to the second synchronization condition being fulfilled and to perform a second activation of the one or more of the outgoing branches associated with the second satisfied branch conditions, and wherein the first synchronization condition and the second synchronization condition are fulfilled within a single activation cycle.

2. The system of claim 1, wherein the branch manager is configured to cause a reset of the synchronization point at completion of the activation cycle to initiate a next activation cycle.

3. The system of claim 1 wherein the flow condition evaluator is configured to access branch data collected by the branch manager to determine fulfillment of the first and second synchronization conditions, the branch data including identified, activated branches from among the plurality of incoming branches within an execution instance of the workflow process.

4. The system of claim 1 wherein the flow condition evaluator is configured to access workflow data to determine fulfillment of the first and second the synchronization conditions, the workflow data associated with an execution instance of the workflow process.

5. The system of claim 1 wherein the branch condition evaluator is configured to access workflow data to evaluate the branch condition, the workflow data associated with an execution instance of the workflow process.

6. The system of claim 1 wherein determining the first and second of the one or more of the branch conditions are satisfied comprises evaluating each of the one or more branch conditions against evaluation rules, wherein the evaluation rules are associated with the workflow process.

7. The system of claim 6 wherein the branch condition evaluator is configured to access modified evaluation rules to evaluate a current branch condition, the modified evaluation rules having been modified from the evaluation rules based on a previous synchronization condition evaluation or previous branch condition evaluation.

8. The system of claim 1 wherein the branch manager comprises a token handler that is configured to receive a token in association with the detection of the activated branch, and further configured to build a token list including tokens from all activated branches within the activation cycle of the plurality of incoming branches.

9. The system of claim 8 wherein the token handler is configured to cache additional tokens received on any incoming branch which is already activated in a current activation cycle for use in a next activation cycle that is initiated after completion of the current activation cycle.

10. A method comprising:
   detecting activations of any of a plurality of incoming branches at a synchronization point of a workflow process having a plurality of outgoing branches, wherein each outgoing branch is associated with a respective branch condition;
   recording which incoming branches have activated as part of a current activation cycle of the synchronization point, wherein each of the plurality of incoming branches activates exactly once in an activation cycle, and the activation cycle is complete when each of the plurality of incoming branches is recorded as being activated;
   determining a first synchronization condition as being fulfilled in response to a first number of activations being detected;
   determining a first one or more of the branch conditions as being satisfied in response to the first synchronization condition being fulfilled;
   performing a first activation of the one or more of the outgoing branches associated with the first satisfied branch conditions;
   determining a second synchronization condition as being fulfilled in response to a second number of activations being detected after performing the first activation;
   determining a second one or more of the branch conditions as being satisfied in response to the second synchronization condition being fulfilled; and
   performing a second activation of the one or more of the outgoing branches associated with the second satisfied branch conditions, wherein the first and the second outgoing branch activations are executed within a single activation cycle.

11. The method of claim 10 wherein detecting activations of a plurality of incoming branches at a synchronization point having a plurality of outgoing branches, comprises:
   receiving tokens on the plurality of incoming branches; and
   caching tokens that are not part of a current activation cycle of the plurality of incoming branches.

12. The method of claim 10 wherein executing a first synchronization in response to a first number of activations being detected, comprises:
   evaluating a synchronization expression each time an activation is detected until the synchronization expression evaluates to true.

13. The method of claim 10 wherein determining the first and second of the one or more of the branch conditions are satisfied comprises evaluating each of the one or more branch conditions.

14. A computer program product for executing instances of process models, the computer program product comprising a non-transitory computer-readable storage medium including executable code that, when executed, is configured to cause at least one data processing apparatus to execute an orchestration engine, the orchestration engine configured to:
   detect activations of any of a plurality of incoming branches at a synchronization point of a workflow process having a plurality of outgoing branches, wherein each outgoing branch is associated with a respective branch condition;
   record which incoming branches have activated as part of a current activation cycle of the synchronization point, wherein each of the plurality of incoming branches activates exactly once in an activation cycle, and the activation cycle is complete when each of the plurality of incoming branches is recorded as being activated;
   determine a first synchronization condition as being fulfilled in response to a first number of activations being detected;
   determine a first one or more of the branch conditions as being satisfied in response to the first synchronization condition being fulfilled;
   perform a first activation of the one or more of the outgoing branches associated with the first satisfied branch conditions;
   determine a second synchronization condition as being fulfilled in response to a second number of activations being detected after performing the first activation;
   determine a second one or more of the branch conditions as being satisfied in response to the second synchronization condition being fulfilled; and
   perform a second activation of the one or more of the outgoing branches associated with the second satisfied branch conditions, wherein the first and the second outgoing branch activations are executed within a single activation cycle.

15. The computer program product of claim 14 wherein detecting activations of a plurality of incoming branches at a synchronization point having a plurality of outgoing branches, comprises:
   receiving tokens on the plurality of incoming branches; and
   caching tokens that are not part of a current activation cycle of the plurality of incoming branches.

16. The computer program product of claim 14 wherein determining the first and second of the one or more of the branch conditions are satisfied comprises evaluating each of the one or more branch conditions against evaluation rules, wherein the evaluation rules are associated with the workflow process.

* * * * *